United States Patent Office 3,230,114
Patented Jan. 18, 1966

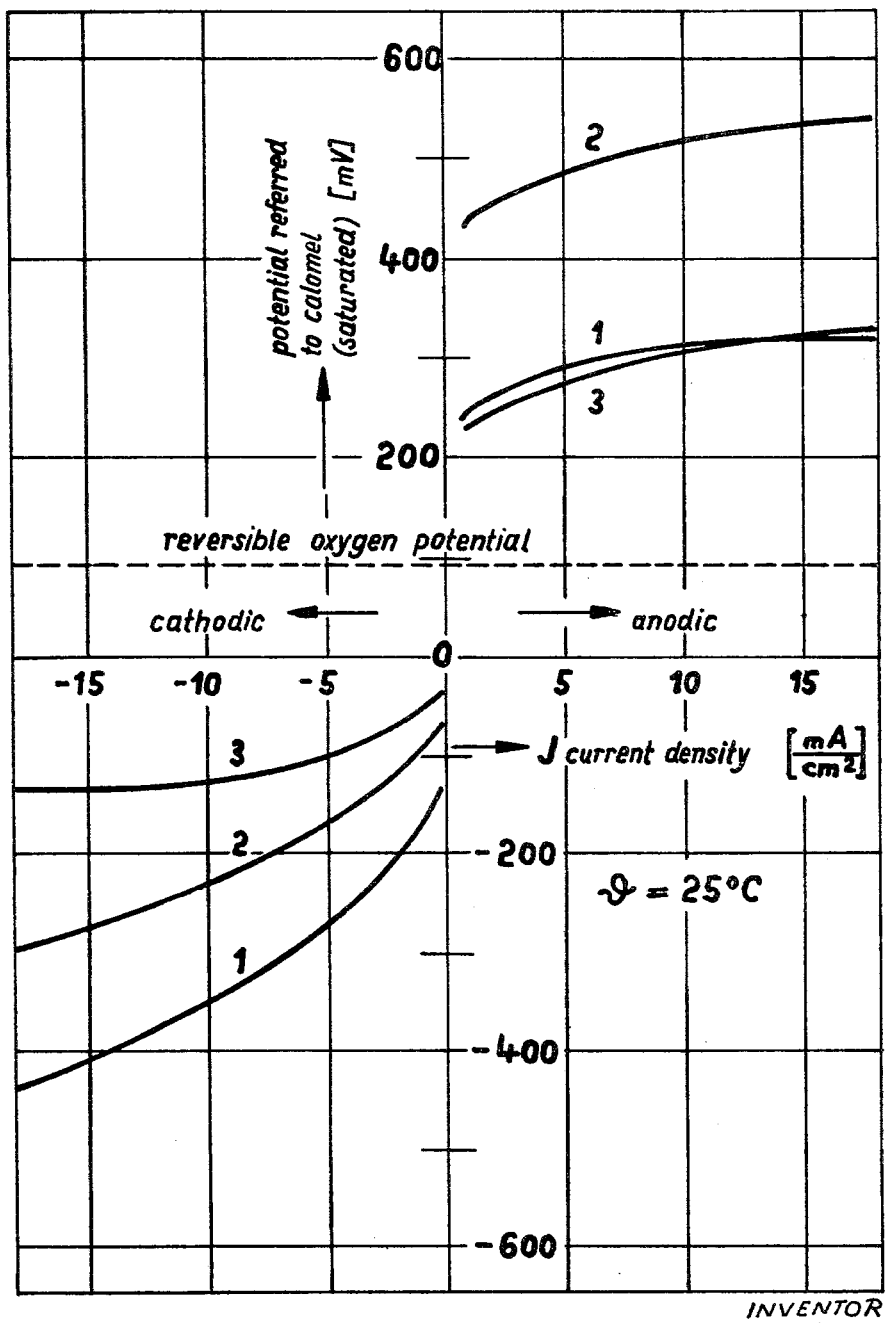

3,230,114
CATALYST ELECTRODES AND PROCESS FOR
STORING ELECTRICAL ENERGY
Karl-Hermann Friese, Eduard Justi, and August Winsel,
Braunschweig, Germany, assignors, by mesne assignments, to Varta Aktiengesellschaft, Frankfurt am Main,
Germany, and Siemens-Schuckert-Werke Aktiengesellschaft, Erlangen, Germany, both corporations of
Germany
Filed July 8, 1959, Ser. No. 826,891
Claims priority, application Germany, July 16, 1958,
R 23,702
4 Claims. (Cl. 136—86)

The present invention relates to the storing of electrical energy and, more particularly, to the storing of electrical energy by temporary conversion into the chemical energy of combustible gases by means of catalyst electrodes.

A process for the storage of electrical energy has been suggested heretofore, which involves the temporary conversion into chemical energy of oxyhydrogen gas by means of pressure electrolysis of water with separate collection and storage thereof. As needed, electrochemical conversion of said chemical energy, preferably by recombination of the gases evolved in the electrolysis, i.e. hydrogen and oxygen, may be conveniently effected. In this known process, the electrolytic production and recombination of hydrogen and oxygen is carried out in the same cell, which is provided with a device for separately collecting the gases evolved in the electrolysis and which further contains an alkaline solution as the aqueous electrolyte. The electrolysis and recombination is effected on a pair of gas diffusion electrodes having the structure of a double-skeleton catalyst electrode body, whereby the electrolyte is in contact therewith on the one side and the particular reaction gas, i.e. hydrogen or oxygen, is in separate contact therewith on the other.

It is well known that of all metals nickel has the smallest oxygen overvoltage (deviation of the reversible oxygen potential), and in consequence thereof this metal is particularly prefererd as the anode material in electrolytic cells. Also well known are the outstanding catalytic properties of silver in electrodes used for the cathodic reduction of oxygen.

Therefore, the electrode used in said known process for the evolution and dissolution of oxygen is preferably an electrode containing silver, such as for example a double-skeleton catalyst electrode comprising an electrically conductive supporting skeleton serving as a carrier and having embedded therein skeleton granules consisting of or containing Raney-silver. Generally, 1 to 80% by weight of Raney silver may be present as catalyst material in the electrode body in addition to 99–20% by weight of supporting skeleton material. The electrically conductive supporting skeleton may contain silver, nickel or other suitable metals resistant to alkaline solutions or relatively well conductive semi-conductor materials, e.g. graphitized carbon.

Particularly favorable are electrodes in which the two metals, silver and nickel, are simultaneously present in as finely divided form as is possible. Double-skeleton catalyst electrodes containing from 80 to 20% by weight of Raney silver embedded in a supporting skeleton containing from 20 to 80% by weight of nickel powder, preferably carbonyl nickel, have proved very well in performance. Also the reverse situation, i.e. using silver as the supporting skeleton and nickel as the Raney skeleton or catalyst portion, was found to be suitable from the electrochemical point of view. However, such an electrode is too expensive in view of the high price of silver and too susceptible to fracture and breakdown in view of the poorer mechanical properties of silver as the supporting skeleton in comparison with other materials to have any chance of being commercially accepted.

Electrodes of the foregoing type combine the small oxygen overvoltage of nickel with the outstanding catalytic activity of silver in the cathodic reduction of oxygen. Therefore, such electrodes approach the ideal reversible oxygen electrode more closely than electrodes consisting of a single metal or of any other combination of metals are capable of doing.

It is an object of the invention to provide a process for making electrodes, which are capable of most closely approaching the ideal reversible oxygen electrode, as compared to conventional electrodes made of a single metal or any other combination of metals than silver and nickel in accordance with the invention.

Other and further objects of the invention will become apparent from a study of the within specification and accompanying drawing, in which The figure is a graphic representation of the characteristic curves of two prior art electrodes, as compared to that of the electrode prepared in accordance with the invention, wherein the cathodic and anodic current densities are plotted with respect to potential expressed in millivolts.

It has now been found in accordance with the invention that electrodes which, in addition to Raney silver, also contain Raney nickel embedded in a supporting skeleton of carbonyl nickel powder exhibit a particularly favorable efficiency.

Thus, in accordance with the invention, a process may be provided for the storage of electrical energy by temporary conversion into the chemical energy of oxyhydrogen gas by means of pressure electrolysis of water with separate collection and storage and, as needed for the electrochemical conversion of said chemical energy, preferably by recombination of the gases evolved in the electrolysis, i.e. hydrogen and oxygen. The electrolytic evolution and recombination of hydrogen and oxygen is conveniently effected in the same cell, which is provided with means for separately collecting the gases evolved in the electrolysis and which further contains an alkaline solution as the aqueous electrolyte. Said evolution and recombination of hydrogen and oxygen efficiently takes place on a pair of gas diffusion electrodes, each having the structure of a double-skeleton catalyst electrode body, whereby the electrolyte is contacted on one side of each electrode, respectively, and the particular reaction gas, i.e. hydrogen or oxygen, on the other side of each electrode, respectively.

The process is characterized in that the evolution and dissolution of oxygen is effected by means of a particular type of electrode which, in addition to containing Raney silver, also contains Raney nickel embedded in a supporting skeleton of carbonyl nickel powder. From 10 to 80% by weight, and preferably from 10 to 30% by weight, of the total Raney metal portion comprises Raney nickel and with preferably a total of 80 to 20% by weight of Raney metal being present in addition to 20 to 80% by weight of supporting skeleton material.

The improvement of the efficiency by the simultaneous use of Raney silver and Raney nickel is believed to be due to the low oxygen overvoltage on the large-surface nickel. According to G. Kortüm, "Lehrbuch der Elektrochemie," page 394, Verlag Chemie, Weinheim 1952, the oxygen overvoltage on spongy nickel is 0.05 volt, as compared with 0.12 volt on bare nickel. Since Raney nickel has a very porous structure, as compared with carbonyl nickel, it has a promoting effect on the oxygen evolution due to its larger surface area, so that a higher current densities the polarization is lowered even more than the overvoltage. However, in electrolysis, the difference in overvoltages ensures an improvement in efficiency of 6% with a corresponding improvement in efficiency of the overall storage cycle.

It is particularly advantageous if the Raney silver alloy used for preparing the Raney silver contains from 0.01% to 10% by weight of manganese and/or from 0.01 to 5% by weight of chromium and/or from 0.01 to 5% by weight of molybdenum, based on the silver portion, with the total amount of the added metals being preferably not more than 10% by weight, based on the silver portion in the Raney alloy.

One advantage achieved by the addition of one or more of these metals is a better grindability of the Raney alloy so that it may be very easily reduced in size to form extremely fine powders. Moreover, the incorporation of one or more of said metals results in a substantial improvement of the equilibrium rest potential of the electrode so that the deviation from the reversible oxygen potential is particularly low. Furthermore, the terminal voltage with a given current drawn becomes higher by alloying the silver with the additional metals.

The following example is given to illustrate the process of the invention, and it is to be understood that the invention is not to be limited thereto.

*Example 1*

Electrode 1 is prepared from a powder mixture consisting of 1.5 parts by weight of carbonyl nickel powder having a particle diameter of from 1 to 5 microns and 1.0 part by weight of a pulverulent Raney nickel alloy containing Ni and Al in a ratio by weight of 50:50 and having particles of 75 to 100 microns diameter by hot-pressing at 450° C. with a pressure of 5000 kg./cm.$^2$. The electrode was activated by dissolving out the Al with 6-normal KOH.

Electrode 2 is prepared from a fine powder of molecular silver (particle diameter: $<$10 microns), with ammonium carbonate as the pore-forming substance, by pressing under a pressure of 2000 kg./cm.$^2$ and subsequently sintering at 400° C.

Electrode 3 is prepared in accordance with the invention from a powder mixture comprising 1.5 parts by weight of carbonyl nickel powder having a particle diameter of from 1 to 5 microns, 0.3 part by weight of pulverulent Raney nickel alloy composed of Ni and Al in a ratio by weight of 50:50 and having a particle diameter of 75 to 100 microns, and 0.7 part by weight of a pulverulent Raney silver alloy having the composition Ag:Al:Mn=64.7:35:0.3% by weight and a particle size of 75 to 100 microns by hot-pressing at 450° C. with a pressure of 5000 kg./cm.$^2$. The electrode was activated by treatment with 6-normal KOH, as in the case of electrode 1.

The characteristic curves of these three electrodes are shown in the graph of the figure. As may be seen, the gap or jump from the anodic leg to the cathodic leg of the characteristic curve is lowest in case of the electrode 3, prepared in accordance with the invention. Thus, said electrode provides the closest approach to the ideal reversible oxygen electrode.

What is claimed is:

1. In a method of storing electrical energy by temporary conversion into the chemical energy of oxyhydrogen gas by means of pressure electrolysis of water with separate collection and storage of oxygen and hydrogen and electrochemical conversion of the hydrogen and oxygen evolved in the electrolysis, the electrolytic evolution and conversion being effected in the same cell in the presence of an alkaline solution as the aqueous electrolyte, and taking place on a pair of gas diffusion double-skeleton catalyst electrodes each comprising a supporting skeleton in the form of a porous structure of a sintered powder having metallic conductivity with Raney catalyst skeleton granules embedded therein, wherein the electrolyte is in contact with one side of each electrode and the collected hydrogen and oxygen on the other side of each electrode, respectively, the improvement which comprises maintaining the evolution and conversion of oxygen on such an electrode which, in addition to Raney silver granules, also contains Raney nickel granules embedded in a supporting skeleton of carbonyl nickel, from 10 to 80% by weight of the total Raney metal portion consisting of Raney nickel and from 80 to 20% by weight of the total weight of the electrode consisting of Raney metal, said Raney nickel and Raney silver catalyst skeleton granules having been activated by dissolving out the dissolvable portion of the respective Raney metal alloy used, said alloy having been composed originally of at least about 15% by weight dissolvable metal component with the remainder being the corresponding Raney metal.

2. The improvement according to claim 1, wherein from 10 to 30% by weight of the total Raney metal portion is nickel, the Raney silver portion of the Raney metal portion of the electrode additionally containing about 0.3% by weight of manganese, based on the weight of said silver portion prior to activation of the Raney catalyst material.

3. Double-skeleton catalyst electrode for use in a liquid electrolyte in a secondary cell capable of alternately generating and consuming electrical energy, comprising a supporting skeleton in the form of a porous structure of sintered carbonyl nickel powder having metallic conductivity with from 20–80% by weight of a mixture of Raney nickel and Raney silver catalyst skeleton granules embedded therein, the Raney silver portion of said mixture additionally containing about 0.3% by weight of manganese, based on the weight of said silver portion prior to activation of the Raney catalyst material, the amount of Raney nickel in said mixture being from 10 to 30% by weight of the total Raney metal present, said Raney nickel and Raney silver catalyst skeleton granules having been activated by dissolving out the aluminum portion of the respective Raney metal alloy used, the Raney nickel alloy having been composed originally of about 50% by weight aluminum with the remainder being nickel, and the Raney silver alloy having been composed originally of about 35% by weight aluminum, 64.7% by weight silver, and 0.3% by weight manganese.

4. In a method of storing electrical energy by temporary conversion into the chemical energy of oxyhydrogen gas by means of pressure electrolysis of water with separate collection and storage of oxygen and hydrogen and electrochemical conversion of the hydrogen and oxygen evolved in the electrolysis, the electrolytic evolution and conversion being effected in the same cell in the presence of an alkaline solution as the aqueous electrolyte, and taking place on a pair of gas diffusion double-skeleton catalyst electrodes each comprising a supporting skeleton in the form of a porous structure of a sintered powder having metallic conductivity with Raney catalyst skeleton granules embedded therein, wherein the electrolyte is in contact with one side of each electrode and the collected hydrogen and oxygen on the other side of each electrode, respectively, the improvement which comprises maintaining the evolution and conversion of oxygen on such an electrode which, in addition to Raney silver granules, also contains Raney nickel granules embedded in a supporting skeleton of carbonyl nickel, from 10 to 80% by weight of the total Raney metal portion consisting of Raney nickel and from 80 to 20% by weight of the total weight of the electrode consisting of Raney metal, the Raney silver portion of the Raney metal portion of the electrode additionally containing about 0.3% by weight of manganese, based on the weight of said silver portion prior to activation of the Raney catalyst material, said Raney nickel and Raney silver catalyst skeleton granules having been activated by dissolving out the aluminum portion of the respective Raney metal alloy used, the Raney nickel alloy having been composed originally of about 50% by weight aluminum with the remainder being nickel, and the Raney silver alloy having been composed originally of about 35% by weight aluminum, 64.7% by weight silver, and 0.3% by weight manganese.

References Cited by the Examiner

UNITED STATES PATENTS

| | | | |
|---|---|---|---|
| 2,384,463 | 9/1945 | Gunn et al. | 136—86 |
| 2,615,932 | 10/1952 | Marko | 136—122 |
| 2,796,456 | 6/1957 | Stokes | 136—120 |
| 2,925,454 | 2/1960 | Justi et al. | 136—86 |
| 2,928,891 | 3/1960 | Justi et al. | 136—120 |
| 2,938,064 | 5/1960 | Kordesch | 136—86 |

FOREIGN PATENTS 806,644  12/1958  Great Britain.

WINSTON A. DOUGLAS, *Primary Examiner.*

JOHN H. MACK, JOSEPH REBOLD, JOHN R. SPECK, *Examiners.*